(12) United States Patent
Huang et al.

(10) Patent No.: US 9,681,394 B2
(45) Date of Patent: Jun. 13, 2017

(54) METHOD FOR POWER CONTROL, USER EQUIPMENT, COMPUTER PROGRAM AND STORAGE MEDIUM

(75) Inventors: Zhen Huang, Beijing (CN); Xie Li, Beijing (CN); Wenxue Yang, Beijing (CN)

(73) Assignee: Optis Circuit Technology, LLC, Plano, TX (US)

( * ) Notice: Subject to any disclaimer, the term of this patent is extended or adjusted under 35 U.S.C. 154(b) by 200 days.

(21) Appl. No.: 14/374,936

(22) PCT Filed: Feb. 28, 2012

(86) PCT No.: PCT/CN2012/071727
§ 371 (c)(1),
(2), (4) Date: Jul. 28, 2014

(87) PCT Pub. No.: WO2013/127062
PCT Pub. Date: Sep. 6, 2013

(65) Prior Publication Data
US 2015/0249960 A1    Sep. 3, 2015

(51) Int. Cl.
*H04B 15/00*        (2006.01)
*H04B 1/00*         (2006.01)
(Continued)

(52) U.S. Cl.
CPC ......... *H04W 52/241* (2013.01); *H04W 52/12* (2013.01); *H04W 52/225* (2013.01); *H04W 52/265* (2013.01); *H04W 88/06* (2013.01)

(58) Field of Classification Search
CPC ... H04B 1/1615; H04B 1/707; H04W 52/022; H04W 52/04; H04W 52/06; H04W 52/08;
(Continued)

(56) References Cited

U.S. PATENT DOCUMENTS

| 6,546,260 B2 * | 4/2003 | Esmailzadeh ....... H04W 52/362 |
| | | 455/127.1 |
| 7,027,829 B1 * | 4/2006 | Laakso ................. H04W 52/30 |
| | | 370/335 |

(Continued)

FOREIGN PATENT DOCUMENTS

| CN | 1452417 A    | 10/2003 |
| CN | 101044700 A  | 9/2007  |

OTHER PUBLICATIONS

International Search Report issued in corresponding International application No. PCT/CN2012/071727, date of mailing Nov. 29, 2012.

(Continued)

*Primary Examiner* — Yuwen Pan
*Assistant Examiner* — Paul P Tran
(74) *Attorney, Agent, or Firm* — Spencer C. Patterson; Grable Martin Fulton PLLC

(57) ABSTRACT

A method for power control and a user equipment, UE, determine a current power control mode of the UE based on an adjustment trend of the UE with respect to signal transmission power of a base station, and a variation trend of the received signal quality. A target value of the received signal quality of inner-loop power control is reset after the power control mode of the UE tends to normal, so as to return the transmission power of the base station to the UE to a normal level as soon as possible, thereby to inhibit adverse influences caused by the windup effect.

15 Claims, 8 Drawing Sheets

(51) Int. Cl.
  *H04B 7/00*      (2006.01)
  *G01R 31/08*     (2006.01)
  *G06F 11/00*     (2006.01)
  *G08C 15/00*     (2006.01)
  *H04J 1/16*      (2006.01)
  *H04J 3/14*      (2006.01)
  *H04L 1/00*      (2006.01)
  *H04L 12/26*     (2006.01)
  *H04B 7/185*     (2006.01)
  *H04W 4/00*      (2009.01)
  *H04L 27/10*     (2006.01)
  *H04W 52/24*     (2009.01)
  *H04W 52/22*     (2009.01)
  *H04W 52/26*     (2009.01)
  *H04W 52/12*     (2009.01)
  *H04W 88/06*     (2009.01)

(58) Field of Classification Search
  CPC ..... H04W 52/10; H04W 52/12; H04W 52/18;
         H04W 52/20; H04W 52/24; H04W 52/26;
         H04W 52/221; H04W 52/226; H04W
         52/241; H04W 52/265; H04W 52/267;
         H04W 52/343; H04W 52/362; H04W
         52/367; H04W 52/40; H04W 52/48;
         H04W 52/50; H04W 52/52; H04W 52/54;
         H04W 40/12; H04L 1/0001; H04L
         1/0002; H04L 1/0015; H04L 1/0016;
         H04L 1/002; H04L 1/203; H04L 1/20;
         H04L 5/0044; H04L 5/125; H04L 5/16;
         H04L 5/32
  USPC ....... 370/230, 252, 311, 318, 321, 328, 329,
         370/333, 335, 342, 347, 478; 375/130,
         375/132, 141, 148, 227, 284, 285, 346,
         375/348; 455/1, 63.1, 67.11, 67.13, 69,
         455/101, 423, 439, 453, 507, 522, 561
  See application file for complete search history.

(56) References Cited

U.S. PATENT DOCUMENTS

| | | | |
|---|---|---|---|
| 7,339,994 B2* | 3/2008 | Lin | H04W 52/12 |
| | | | 375/240.27 |
| 8,478,279 B2* | 7/2013 | Nishikawa | H04W 52/08 |
| | | | 455/42 |
| 2003/0134656 A1* | 7/2003 | Chang | H04W 52/12 |
| | | | 455/522 |
| 2004/0227970 A1 | 11/2004 | Ohara | |
| 2005/0083840 A1* | 4/2005 | Wilson | H04L 47/10 |
| | | | 370/230 |
| 2005/0201499 A1* | 9/2005 | Jonsson | H04L 25/03006 |
| | | | 375/348 |
| 2006/0014558 A1* | 1/2006 | Takaki | H04W 52/20 |
| | | | 455/522 |
| 2006/0187876 A1 | 8/2006 | Schmidl et al. | |

OTHER PUBLICATIONS

Written Opinion of the International Searching Authority issued in the corresponding International application No. PCT/CN2012/071727, date of mailing Nov. 29, 2012.

International Preliminary Report on Patentability issued in corresponding International application No. PCT/CN2012/074172, date of issuance Oct. 29, 2013.

* cited by examiner

METHOD FOR POWER CONTROL, USER EQUIPMENT, COMPUTER PROGRAM AND STORAGE MEDIUM

FIELD

The present invention relates to mobile communication field, and in particular to a method for inhibiting windup effect in power control, a corresponding UE (User Equipment), a corresponding computer program and a corresponding storage medium.

BACKGROUND

Downlink power control is usually used for limiting interference in a system so as to reduce intra- and intercell interference level, reduce consumption of transmission power of a base station, and ensure service quality of a user equipment. Power control of a physical layer usually consists of inner loop power control and outer loop power control.

Referring to FIG. 1, in control of transmission power of a base station for downlink signal, a closed-loop power control mode may be used. In this control mode, the power control includes inner-loop power control 1 and outer-loop power control 2. The outer-loop power control 2 aims to obtain a real-time updated target value (e.g., a target signal-to-inference ratio or signal-to-noise ratio) for signal quality by comparing the monitored actual signal quality (which may e.g. be a statistic value of a block error rate) with the target signal quality (which may e.g. be a target block error rate) desired for services, and allocate the target value to an inner-loop power control process for the inner-loop power control. The inner-loop power control 1 may predict signal quality of a next subframe according to the signal quality currently measured (e.g., the signal-to-interference ratio or the signal-to-noise ratio) and the past several measured values for the signal quality, obtain a power control command concerning power adjustment by comparing a predicted value of the signal quality with the target value of the signal quality provided by the outer-loop power control, and transmit the power control command to the base station via an uplink signal. The base station typically regulates transmission power of the downlink signal according to the power control command.

Considering a weak signal scenario, e.g., when a user equipment (UE) is located at an edge of a cell, a target signal-to-interference ratio of the UE may be continuously increased, even to or beyond a maximum permissible value (at this time, the base station may transmit a signal to the UE at a maximum transmission power). During this process, there is no obvious improvement on demodulation performance of the signals received by the UE. When the UE moves towards the base station, the channel environment is improved. However, limited to a longer adjustment cycle and a smaller adjustment step of the outer loop, the UE will take many subframes so as to gradually adjust the target signal-to-interference ratio to an appropriate level. During a period of these subframes, usually signal transmission power of the base station is obviously greater than a proper level, and as a result, strong interference is brought to the other UEs (User Equipments) working at the same cell. This phenomenon is usually called as windup effect.

SUMMARY

The present invention provides a method for power control, a user equipment, a computer program and a storage medium. An object of some embodiments of the invention is to inhibit adverse influence caused by windup effect.

In some embodiments of the present invention, a current power control mode of the UE is determined based on an adjustment trend of the UE with respect to signal transmission power of a base station and a variation trend of received signal quality. The power control mode includes a windup effect mode and a normal power control mode.

It is judged whether the power control mode of the UE returns to the normal power control mode based on the recorded power control mode of the UE.

When the power control mode of the UE returns to the normal power control mode, a target value of the received signal quality for inner-loop power control is reset based on the variation trend of the signal quality received at a UE side.

In some embodiments of the present invention, the received signal quality may be a signal-to-interference ratio value or signal-to-noise ratio value.

In some embodiments of the present invention, the adjustment trend may be determined according to a Transmit Power Control (TPC) command transmitted by the UE to the base station in the inner-loop power control.

In some embodiments of the present invention, it is disclosed an optional way for determining the current power control mode of the UE may comprise:

determining the adjustment trend of the UE with respect to the signal transmission power of the base station and the variation trend of the received signal quality of the UE;

judging whether the variation trend matches the adjustment trend;

judging, when the variation trend matches the adjustment trend, that the current power control mode of the UE is the normal power control mode, and otherwise, judging that the current power control mode of the UE is the windup effect mode.

In some embodiments of the present invention, it is disclosed an optional way for determining the variation trend of the received signal quality of the UE, including:

acquiring a plurality of estimated values obtained by performing estimation on the received signal quality in a latest preset period of time;

performing curve fitting on the plurality of estimated values to obtain a curve; and calculating a curve slope of the curve at the latest estimated value to obtain the variation trend.

In some embodiments of the present invention, it is disclosed an optional way for determining the adjustment trend of the UE with respect to signal transmission power of a base station, including:

acquiring, in a latest period of time, a total number of times indicating that the UE requires the base station to adjust the signal transmission power, a first number of times indicating that the UE requires the base station to increase the signal transmission power, and a second number of times indicating that the UE requires the base station to decrease the signal transmission power;

calculating a first quotient of the first number and the total number, and a second quotient of the second number and the total number;

determining, when the first quotient is greater than a first threshold, that the adjustment trend is that the UE requires the base station to increase the signal transmission power continuously;

determining, when the second quotient is greater than a second threshold, that the adjustment trend is that the UE requires the base station to decrease the signal transmission power continuously; and determining, when the first quotient is less than or equal to the first threshold and the second quotient is less than or equal to the second threshold, that the adjustment trend is that the UE requires the base station adjust the signal transmission power non-unidirectionally.

In some embodiments of the present invention, it is disclosed an optional way for judging whether the variation trend matches the adjustment trend, including:

judging whether the variation trend of the received signal quality reaches an expected improvement trend when the adjustment trend is that the UE requires the base station to increase the signal transmission power continuously; if yes, judging that the variation trend matches the adjustment trend; and if not, judging that the variation trend does not match the adjustment trend.

In some embodiments of the present invention, it is disclosed another optional way for judging whether the variation trend matches the adjustment trend, including:

judging whether the variation trend of the received signal quality reaches an expected deterioration trend when the adjustment trend is continuously decreasing the signal transmission power of the base station; if yes, judging that the variation trend matches the adjustment trend; and if not, judging that the variation trend does not match the adjustment trend.

In some embodiments of the present invention, it is disclosed another optional way for judging whether the variation trend matches the adjustment trend, including:

judging that the variation trend matches the adjustment trend when the adjustment trend is non-continuous, unidirectional adjustment.

In some embodiments of the present invention, it is disclosed an optional way for judging whether the power control mode of the UE returns to the normal power control mode, including:

judging that the power control mode returns to the normal power control mode if the power control mode of the UE currently recorded is the normal power control mode and the power control mode of the UE recorded previously is the windup effect mode.

In some embodiments of the present invention, it is disclosed another optional way for judging whether the power control mode of the UE returns to the normal power control mode, including:

counting a first number of the windup effect modes in N power control modes recorded recently, and a second number of the windup effect modes in 2N power control modes recorded recently;

calculating a difference between the second number and the first number to obtain a third number, and then calculating a difference between the third number and the first number to obtain a fourth number; and judging whether the power control mode returns to the normal power control mode by determining whether the fourth number is greater than a predetermined third threshold.

In some embodiments of the present invention, the target value of the received signal quality for inner-loop power control may be determined based on the variation trend of the received signal quality at the UE side.

In some embodiments of the present invention, it is disclosed an optional way for determining and resetting a target value of the received signal quality for the inner-loop power control, including:

determining a target value corresponding to the variation trend, wherein a first target value corresponding to a first variation trend is greater than or equal to a second target value corresponding to a second improvement trend, and the first variation trend is slower than a second variation trend; and setting the target value of the received signal quality for the inner-loop power control as a target value corresponding to the variation trend.

DETAILED DESCRIPTION

According to a method for power control, a UE, a computer program and a storage medium provided by the present invention, a current power control mode of the UE is determined based on an adjustment trend of the IE with respect to signal transmission power of a base station and a variation trend of received signal quality, and then a target value of the received signal quality for inter-loop power control is reset after a power control mode of the UE tends to normal, so as to enable transmission power of the base station to return to a normal level as soon as possible and to reduce interference on the other UEs. The present invention may be applied to a mobile communication system with a closed-loop power control, especially in a CDMA system. In order to enable a person skilled in the art to understand the present invention in a better manner, a TD-SCDMA system is taken as an example hereinafter. However, the present invention shall not be limited to this example.

Figure 1:
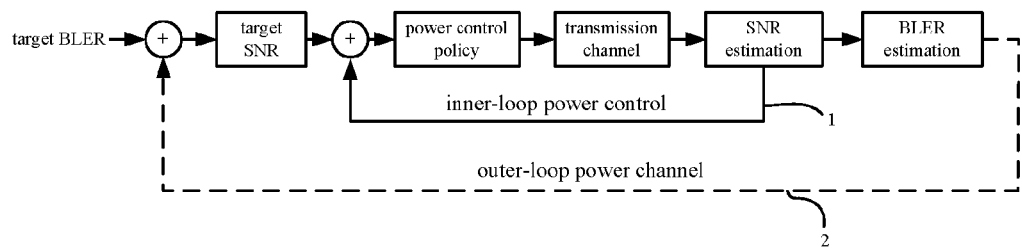
FIG. 1 is a schematic diagram showing a closed-loop power control in the prior art.
Figure 2:
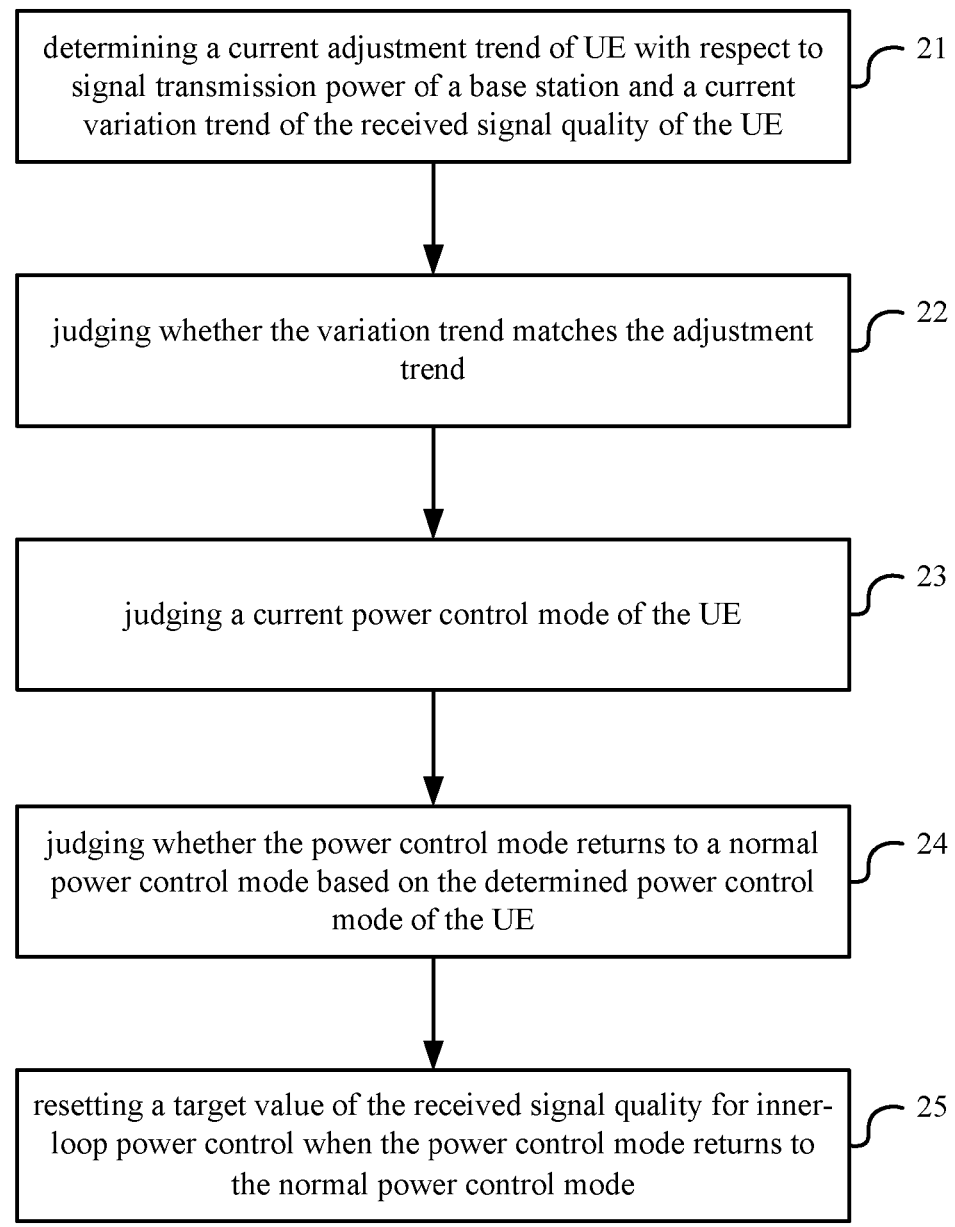
FIG. 2 is a flow chart showing a method for power control according to an embodiment of the present invention.

Referring to FIG. 2, in one embodiment of the present invention, a power control method is provided, which may comprise the following steps:

Step 21: determining a current adjustment trend of a UE with respect to signal transmission power of a base station and a current variation trend of signal quality received by the UE;

Step 22: judging whether the variation trend matches the adjustment trend to obtain a second judgment result;

Step 23: judging that a current power control mode of the UE is a normal power control mode when the second judgment result indicates that the variation trend matches the adjustment trend; and if not, judging that the current power control mode of the UE is a windup effect mode;

Step 24: judging whether the power control mode returns to the normal power control mode after being in the windup effect mode based on the determined power control mode of the UE in a latest period of time; and Step 25: resetting a target value of the received signal quality for inner-loop power control when the power control mode returns to the normal power control mode after being in the windup effect mode.

Figure 3:
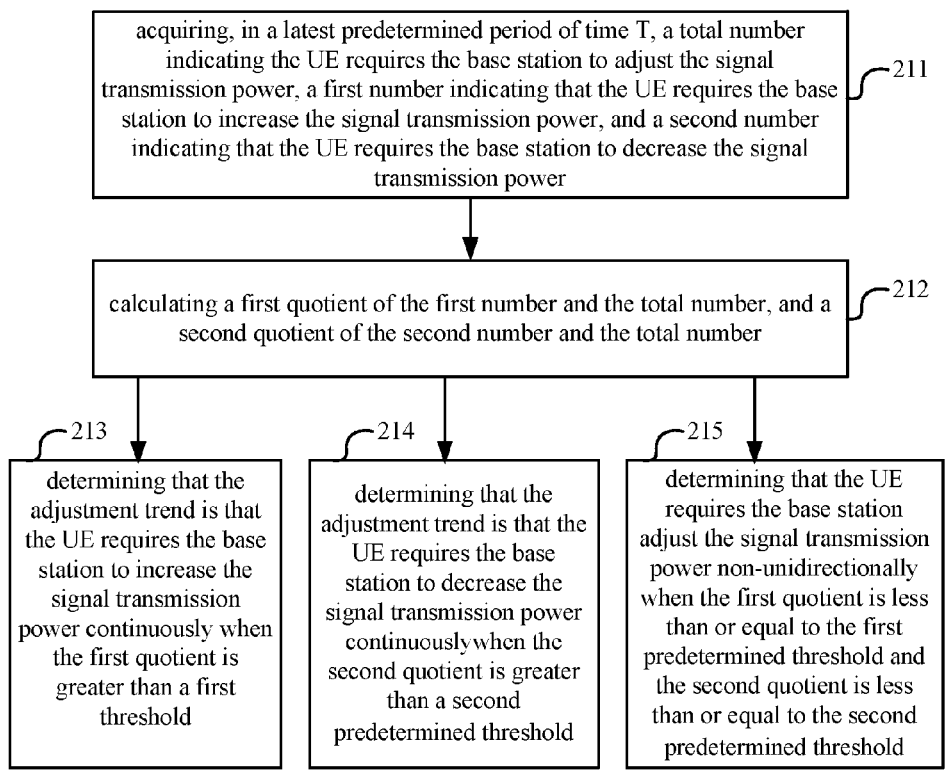
FIG. 3 is a schematic diagram showing specific implementation of Step 21 according to an embodiment of the present invention.

Specifically, in Step 21, the adjustment trend may be determined according to a Transmit Power Control (TPC) command transmitted by the UE to the base station in the inner-loop power control. The TPC command is usually used by UE to instruct the base station to increase or decrease the transmission power. Referring to FIG. 3, which shows a specific implementation of the present invention, determining the adjustment trend may comprise:

Step 211: acquiring, in a latest period of time T, a total number of times indicating that the UE requires the base station to adjust the signal transmission power, a first number of times indicating that the UE requires the base station to increase the signal transmission power, and a second number of times indicating that the UE requires the base station to decrease the signal transmission power;

Step 212: calculating a first quotient of the first number and the total number, and a second quotient of the second number and the total number;

Step 213: determining that the adjustment trend is that the UE requires the base station to increase the signal transmission power continuously when the first quotient is greater than a first threshold;

Step 214: determining that the adjustment trend is that the UE requires the base station to decrease the signal transmission power continuously when the second quotient is greater than a second threshold; and Step 215: determining that the adjustment trend is that the UE requires the base station adjust the signal transmission power non-unidirectionally when the first quotient is less than or equal to the first threshold and the second quotient is less than or equal to the second threshold.

The threshold and the time T may be predetermined. The first threshold is usually greater than 0.5 for indicating that the first number of times indicating that the UE requires the base station to increase the transmission power is greater than the second number of times indicating that the UE requires the base station to decrease the transmission power in the latest predetermined period of time. Preferably, the first threshold may be in the range of 0.7 to 0.9. The second threshold is usually greater than 0.5 for indicating that the second number of times indicating that the UE requires the base station to decrease the transmission power is greater than the first number of times indicating that the UE requires the base station to increase the transmission power in the latest predetermined period of time. Preferably, the second threshold may be in the range of 0.7 to 0.9. When setting the first or second threshold, the current service of the UE and the length of the predetermined period of time may be further taken into consideration.

As an optional way, in Step 21, the adjustment trend may further be determined according to a maximum number of times indicating that the UE continuously requires the base station to increase the signal transmission power and a maximum number of times indicating that the UE continuously requires the base station to decrease the signal transmission power in the latest predetermined period of time. For example, if the maximum number of times indicating that the UE continuously requires the base station to increase the signal transmission power is greater than a predetermined threshold A, it is judged that the adjustment trend is that the UE requires the base station to increase the signal transmission power continuously. If the maximum number of times indicating that the LIE continuously requires the base station to decrease the signal transmission power is greater than a predetermined threshold B, it is judged that the adjustment trend is that the UE requires the base station to decrease the signal transmission power continuously. If the maximum number of times indicating that the UE continuously requires the base station to increase the signal transmission power is less than or equal to the predetermined threshold A, and the maximum number of times indicating that the UE continuously requires the base station to decrease the signal transmission is less than or equal to the predetermined threshold B, it is judged that the adjustment trend is that the UE requires the base station adjust the signal transmission power non-unidirectionally. Here, the thresholds A and B may be determined according to the length of the predetermined period of time and the current service of the UE.

In Step 21, determining a variation trend of signal quality received by the UE may comprise: acquiring a plurality of estimated values obtained by performing estimation on the received signal quality of the UE in the latest predetermined period of time T; performing curve fitting on the plurality of estimated values to obtain a curve; and then calculating a curve slope of the curve at the latest estimated value, to obtain the variation trend.

Here, the curve slope reflects the variation trend of the received signal quality. For example, when a signal-to-interference ratio or signal-to-noise ratio is used as an index for the received signal quality, if the curve slope is less than 0, it means that the received signal quality is in a deterioration trend. Usually, the bigger an absolute value of the curve slope being less than 0, the more serious the deterioration trend. If the curve slope is greater than 0, it means that the received signal quality is in an improvement trend. The bigger the absolute value of the curve slope being greater than 0, the more obvious the improvement trend.

In the embodiments of the present invention, many mathematic curves may be used to perform curve fitting. In order to simplify computation, as a preferable way a Least Square Method (LSM) may be used to perform curve fitting on the plurality of estimated values so as to obtain a straight line, and the slope of the straight line is the curve slope.

In Steps 22-23, when judging whether the variation trend matches the adjustment trend, variation trends corresponding to various adjustment trends may be set in advance. Namely, a variation trend (including deterioration trend and improvement trend) of the received signal quality of the UE in a normal power control mode may be predicted in advance in the adjustment trends according to the adjustment trends of the signal transmission power of the base station, and then the variation trend is used as an expected variation trend to determine whether the variation trend of the received signal from the actual measurement matches the expected variation trend. If not, it means that the UE may currently be in the windup effect mode.

For example, in Step 22, when the adjustment trend of the UE with respect to the signal transmission power of the base station determined in Step 21 is that the UE requires the base station to increase the signal transmission power continuously, if the UE is in a normal power control mode, the received signal quality will be improved gradually. Therefore, it may be determined whether an expected improvement trend is achieved according to the variation trend of the received signal quality determined in Step 21. If yes, it may be judged that the variation trend matches the adjustment trend, and at this time, it may be considered that the UE is in a normal power control mode. If not, it may be judged that the variation trend does not match the adjustment trend, and at this time, it may be considered that the UE is in the windup effect mode. The expected improvement trend may be determined in advance according to the channel environment, the current service and the period of time T.

Specifically, when a signal-to-interference ratio or signal-to-noise ratio is used as an index for the received signal quality and the adjustment trend is that the UE requires the base station to increase the signal transmission power continuously, the expected improvement trend of the received signal quality may be a trend that improvement of the received signal quality reaches a certain degree. If the variation trend is measured by the curve slope, the expected improvement trend is a trend that the curve slope is greater than a predetermined threshold C (which is a value greater than 0 and may be determined in advance according to the channel environment, the current service and the period of time T). If the actual variation trend of the received signal quality is less than the predetermined threshold C, it may be judged that the variation trend does not match the adjustment trend. If the actual variation rend of the received signal quality is greater than or equal to the predetermined threshold C, it may be judged that the variation trend matches the adjustment trend.

For example, in Step 22, when the adjustment trend of the UE with respect to the signal transmission power of the base station determined in Step 21 is that the UE requires the base station to decrease the signal transmission power continuously, if the UE is in a normal power control mode, the received signal quality shall be deteriorated gradually. Therefore, it may be determined whether an expected deterioration trend is achieved according to the variation trend of the received signal quality determined in Step 21. If yes, it may be judged that the variation trend matches the adjustment trend, and at this time, it may be considered that the UE is in a normal power control mode. If not, it may be judged that the variation trend does not match the adjustment trend, and at this time, it may be considered that the UE is in the windup effect mode. The expected deterioration trend may be determined in advance according to the channel environment, the current service and the period of time T.

Specifically, when a signal-to-interference ratio or signal-to-noise ratio is used as an index for the received signal quality and the adjustment trend is that the UE requires the base station to decrease the signal transmission power continuously, the expected deterioration trend of the received signal quality may be a trend that the deterioration of the received signal quality reaches a certain degree. If the variation trend is measured by the curve slope, the expected deterioration trend is a trend that the curve slope is less than a predetermined threshold D (which is a value less than 0 and which may be determined in advance according to the channel environment, the current service and the period of time T). If the actual variation trend of the received signal quality is less than the predetermined threshold D, it may be judged that the variation trend matches the adjustment trend. If the actual variation trend of the received signal quality is greater than or equal to the predetermined threshold D, it may be judged that the variation trend does not match the adjustment trend.

In Step 24, there are various ways for judging whether the power control mode returns to the normal power control mode. For example, it is judged that the power control mode returns to be normal power control mode only when a power control mode of the UE is a normal power control mode and a previous power control mode of the UE is a windup effect mode.

As a more reliable condition judgment, in Step 24, judgment may be performed based on a plurality of power control modes of the UE determined in a latest period of time. For example, 2N power control modes recently determined may be divided into first N power control modes and second N power control modes according to the time sequence. A third number of the windup effect modes in the first N power control modes, and a first number of the windup effect modes in the second N power control modes may be counted, and then a difference between the third number and the first number may be calculated. If the difference is greater than a predetermined threshold A1, it may be judged that the power control mode returns to the normal power control mode. If the difference is less than the threshold A1, it is judged that the power control mode does not return to the normal power control mode.

Of course, in the embodiments of the present invention, a fifth number of the normal power control modes in the first N power control modes and a sixth number of the normal power control modes in the second N power control modes may also be counted, and then a difference between the sixth number and the fifth number may be calculated. If the difference is greater than a predetermined threshold A2, it may be judged that the power control mode returns to the normal power control mode.

Of course, in the embodiment of the present invention, whether the power control mode tends to be a normal power control mode may be judged by determining whether a ratio of the first number to the third number is less than a predetermined threshold A3, or whether a ratio of the sixth number to the fifth number is greater than a predetermined threshold A4.

In Step 25, when it is judged that the power control mode returns to the normal power control mode, a target value may be returned to a proper value as soon as possible by resetting the target value of the received signal quality for the inner-loop power control. The target value may be a target value of the signal-to-interference ratio or the signal-to-noise ratio. The proper value may be determined in advance according to a stable value indicating that the target value in the normal power control mode in different channel environments tends to be stable. The target value may then be reset according to the proper value corresponding to the current channel environment of the UE.

Here, a more specific way to implement Step 25 is provided, including: determining a target value corresponding to a variation trend of the received signal quality of history demodulation at the UE side, wherein a first target value corresponding to a first variation trend is greater than or equal to a second target value corresponding to a second improvement trend, and the first variation trend is slower than a second, variation trend; and setting the target value of the received signal quality for the inner-loop power control as the target value corresponding to the variation trend.

An Additive White Gaussian Noise (AWGN) channel environment or a multipath fading CASE1 channel environment in a 3GPP channel model are taken as examples. When the base station increases the signal transmission power, the UE usually has a variation trend of the received signal quality in the AWGN channel environment faster than that in the CASE1 channel environment. Namely, the received signal quality in the AWGN channel environment may be more sensitive to the signal transmission power of the base station. When it returns to a normal power control mode, the received signal quality in the AWGN channel environment will be improved rapidly along with an increase of the transmission power of the base station. Usually, the target value in the AWGN channel environment is less than the target value in the CASE1 channel environment (the signal-to-interference ratio is taken as an example for the target value).

Taking the signal-to-interference ratio being an index for the target value as an example, a better signal-to-interference ratio is a signal-to-interference ratio with a bigger value. For example, when the first variation trend (a first curve slope) is 3 and the second variation trend (a second curve slope) is 5, since the first variation trend is slower than the second variation trend, a first signal-to-interference ratio target value corresponding to the first variation trend may be greater than dr equal to a second signal-to-interference ratio target value corresponding to the second variation trend. Of source, if a code error rate (or a block error rate) is used as an index for the target value, a better code error rate (or the block error rate) is a code error rate (or the block error rate) with a smaller value. At this time, the first signal-to-interference ratio target value corresponding to the first variation trend may be less than or equal to the second signal-to-interference ratio target value corresponding to the second variation trend.

Preferably, the corresponding target value is determined according to speed of the variation trend, and then the target value for the inner-loop power control is reset based thereon. The speed of the variation trend may refer to an absolute value of the corresponding curve slope. Usually, the curve slope with a bigger absolute value has a faster variation trend.

Specifically, according to the correspondence between the variation trend and the target value, stable values indicating that the target value for inner-loop power control tends to be stable in normal power control modes of different channel environments may be determined in advance. Then, simulation is performed on the channel environments respectively to determine the variation trends corresponding to the channel environments. Finally, the stable values of the target value trends in the normal power control mode of the corresponding channel environment are set for different variation trends.

As compared with the way in which it takes many subframes to gradually return the target value to a proper level via the outer-loop power control in the prior art, the power control in this embodiment will be returned to a normal state as soon as possible, and the transmission power of the base station for the UE will also be returned to a normal level through the above-mentioned steps. Therefore, interference on the other UEs is reduced when a bigger transmission power is used, and meanwhile power consumption of the base station will also be saved.

In order to help a person skilled in the art to under the above-mentioned steps in the embodiments of the present invention in a better manner, a TD-SCDMA system is taken hereinafter as an example for further explanation. In this example, it is presumed that the UE is located at an edge of a cell at the beginning, and then moves to the center of the cell.

At first, three first-in-first-out (FIFO) buffers with the same size may be provided, including: 1) a TPC buffer for recording TPC information; 2) a SNR buffer for recording a signal-to-noise ratio of the data demodulated by a receiver; and 3) a flag buffer for recording a current power control mode of the UE. Here, "1" may be used to represent a windup effect mode and "0" may be used to represent a normal power control mode.

The above-mentioned buffers are written one by one in the order of a $1^{st}$ unit, a $2^{nd}$ unit, . . . , and an $M*N^{th}$ unit. "0" is written to all storage units of the buffers during the initialization.

Figure 4:
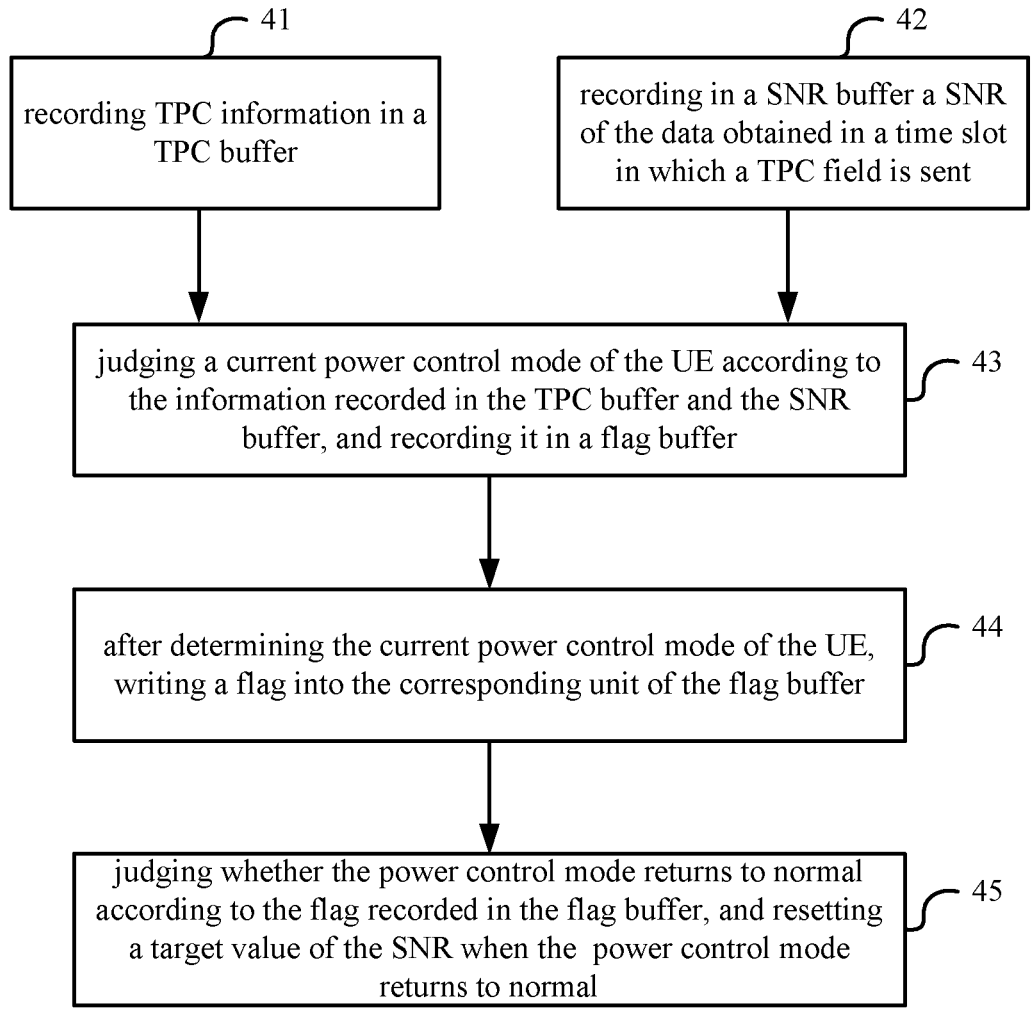
FIG. 4 is a flow chart showing a method for power control according to an embodiment of the present invention.

Referring to FIG. 4, the power control method according to this embodiment may comprise the following steps:

Step 41: the UE records TPC information in the TPC buffer.

In an existing TD-SCDMA system, when it is desired that the base station increases the signal transmission power, usually a binary "11" is filled into a 2-bit TPC field, and when it is desired that the base station decreases the signal transmission power, a binary "00" is filled into the TPC field. Therefore, the adjustment trend may be determined according to the value of the TPC field. The UE usually sends a TPC field in a time slot of a subframe, thus a TPC buffer with a length of M*N may be used to store the values of TPC in the latest M transport blocks of the UE. Each transport block includes N subframes. Here, when the TPC field is "00" (binary), the value of TPC may be recorded as 0 (decimal) in the buffer, and when the TPC field is "11" (binary), the value of TPC may be recorded as 1 (decimal).

Step 42: the UE records in the SNR buffer a signal-to-noise ratio (SNR) of the data obtained after joint detection in the time slot in which the TPC field is sent.

Here, in order to determine a variation trend of the signal-to-noise ratio in the subsequent steps in a more accurate manner, the signal-to-noise ratio is preferably a linear value.

Step 43: a current power control mode of the UE is judged according to the information, recorded in the TPC buffer and the SNR buffer, and then recorded in the flag buffer.

Figure 5:
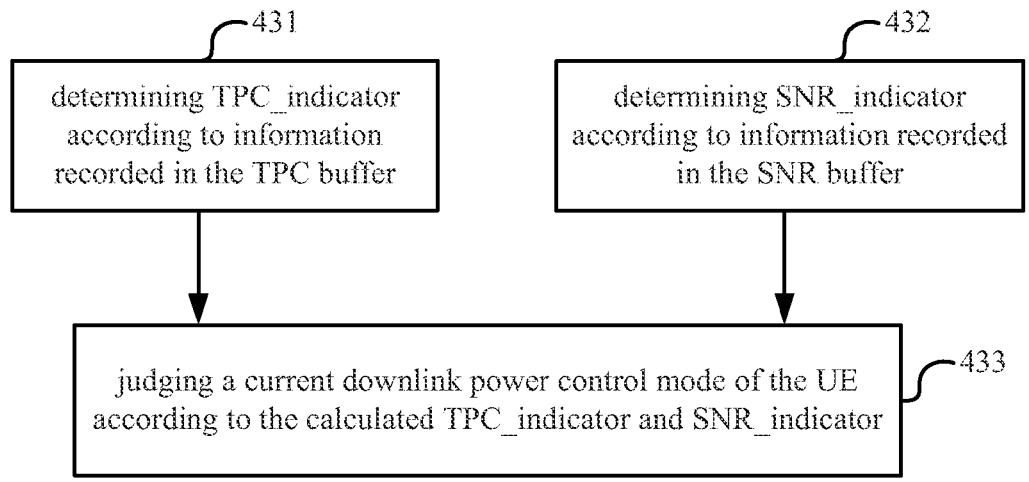
FIG. 5 is a schematic diagram showing specific implementation of Step 43 according to an embodiment of the present invention.

FIG. 5 shows the process for judging the current power control mode of the UE, which may include:

Step 431: determining TPC_indicator according to the information recorded in the TPC buffer by calculating an average value of the values stored in the TPC buffer. If the average value is greater than a predetermined threshold $T_{tpc}$, TPC_indicator is set as 1, and in contrast, TPC_indicator is set as 0. Here, TPC_indicator=1 indicates that an adjustment trend of the signal transmission power of the base station at the UE side is that the UE requires the base station to increase the signal transmission power continuously. Usually, the threshold Ttpc is associated with the length of the TPC buffer and the current service of the UE, and it may be obtained by field test and simulation.

Step 432: determining SNR_indicator according to the information recorded in the SNR buffer, the idea of which is to predict a variation trend of the SNR recorded in the SNR buffer. If the predicted variation trend does not meet the expectation, SNR_indicator is set as 1, and otherwise, SNR_indicator is set as 0.

Specifically, a Least Square Method (LSM) may be used for prediction. Here, a SNR linear value is used so as to ensure estimation accuracy, and the LSM is used to reduce estimation error of a SNR estimation algorithm itself. Considering complexity of the algorithm and performance requirements, a linear prediction algorithm may be used in this embodiment.

It may be presumed that a prediction function as follows:

$$y=a+bx$$

Wherein x=1, 2, . . . , M*N, y=SNR(1), SNR(2), . . . , SNR(M*N), SNR(i) represents the SNR stored in the $i^{th}$ unit of the SNR buffer.

Coefficient b is predicted according to the linear prediction algorithm. Presumed that K=M*N, then a cost function may be expressed as follows:

$$f(a, b) = \sum_{i=1}^{K} (SNR(k) - a - bk)^2$$

In order to ensure that coefficients a and b are optimal values, it needs to meet the following equation:

$$\begin{cases} \frac{\partial f}{\partial a} = -2\sum_{k=1}^{K} (SNR(k) - a - b*k) = 0 \\ \frac{\partial f}{\partial b} = -2\sum_{k=1}^{K} (SNR(k) - a - b*k)k = 0 \end{cases}$$

More specifically, $$\begin{cases} \sum_{k=1}^{K} (SNR(k) - b*k) = K*a \\ \sum_{k=1}^{K} (SNR(k) - b*k)k = a\sum_{k=1}^{K} k \end{cases}$$

After removing coefficient a and rearranging the above equation, coefficient b may be calculated as follows:

$$b = \frac{\sum_{k=1}^{K} k \sum_{k=1}^{K} SNR(k) - K\sum_{k=1}^{K} k * SNR(k)}{\left(\sum_{k=1}^{K} k\right)^2 - K\sum_{k=1}^{K} k^2}$$

Wherein, coefficient b represents a variation trend of SNR. When b>0, it usually means that the SNR is in an improvement trend, i.e., the SNR is increasing. The bigger the coefficient b, the faster the improvement trend of the SNR. When b<0, it usually means that the SNR is in a deterioration trend, i.e., the SNR is decreasing. The bigger the absolute value of coefficient b, the faster the deterioration trend of the SNR.

In this embodiment, a SNR reference threshold $T_{snr}$ is given for judging whether the variation trend of the SNR meets the expectation. The threshold $T_{snr}$ usually depends on the actual channel environment, the current service of the UE, and the length of the buffer. When in specific implementation, the value of the threshold $T_{snr}$ may be determined according to several typical field test results in a TD-SCDMA channel simulation environment.

Here, if b<$T_{snr}$, it means that the variation trend of the SNR does not meet the expectation, and at this time, SNR_indicator may be set as 1. Otherwise, SNR_indicator may be set as 0.

Step 433: judging a current downlink power control mode of the UE according to the calculated TPC_indicator and SNR_indicator. A specific way for the above judging is described as follows. If TPC_indicator and SNR_indicator are both 1, it may be judged that the UE is currently in a windup effect mode. Otherwise, it may be judged that the UE is currently in a normal power control mode.

Usually, in the windup effect mode, it may be possible that the UE continuously requires the base station to increase the transmission power (TPC_indicator=1) and the improvement degree of the received signal quality does not meet the expectation (SNR_indicator=1). In this condition, it may be considered that the UE is in the windup effect mode.

Step 44: after determining the current power control mode of the UE, writing a flag into the corresponding unit of the flag buffer. When the current power control mode is a windup effect mode, the flag has a value of 1, and when the current power control mode is a normal power control mode, the flag has a value of 0.

Step 45: calculating a first sum value of the flags in the first M*N/2 units of the flag buffer, and a second sum value of the flags in the second M*N/2 units of the flag buffer (here, the second M*N/2 units are the units written recently relative to the first M*N/2 units), and then calculating a difference between the first sum value and the second sum value so as to obtain a current factor:

$$\text{factor} = \sum_{k=1}^{M*N/2} \text{flag}(k) - \sum_{k=(M*N/2)+1}^{M*N} \text{flag}(k)$$

By comparing the factor with a threshold $T_f$, when the factor >$T_f$, it is judged that the power control mode of the UE returns to the normal power control mode, and at this time, a target value of the SNR for inner-loop power control is reset. When the factor ≤$T_f$, it is judged that the power control of the UE is still in the windup effect mode, and at this time, the target value remains as unchanged. Here, the value of the threshold $T_f$ usually depends on the length of the buffer, and may be obtained from simulation results. Preferably, the threshold $T_f$ may be set as M*N/4.

In the above-mentioned steps, when judging whether the power control mode of the UE returns to the normal power control mode, all data stored in the flag buffer, but not merely the power control modes judged currently and previously, are taken into consideration, and as a result, the judgment accuracy may be increased. Of course, only part of data stored in the flag buffer may be taken into consideration whether the power control mode of the UE returns to the normal power control mode.

In the above-mentioned steps, it may be unnecessary to reset the target value immediately when the UE is still in the windup effect mode. This is because it will not bring any improvement on the performance, and instead it will affect the final performance. Moreover, the resetting of the target value many times will also cause the system unstable.

In addition, when the UE turns from the normal power control mode to the windup effect mode, an outer-loop power control algorithm identical to that in the prior art may be used to adjust the target value.

Through the above-mentioned steps, when the power control mode of the UE returns to normal, the target value of SNR for inner-loop power control is reset so that it can directly affect the performance of the downlink power control. If the target value is set improperly, the UE will take more time to return to the normal power control mode. During this period, the system capacity will be affected obviously.

In this embodiment, coefficient b may be used again to determine a reset value of the SNR. One possible way includes: predefining different thresholds $T_{reset}$, comparing coefficient b with these thresholds, judging a range to which coefficient b belongs, and determining a value of the SNR corresponding to the range as the reset value. The thresholds may be determined according to several field test results in a TD-SCDMA channel simulation environment. The value of the SNR corresponding to each range may be set according to a stable value when the target value of the SNR tends to be stable in the corresponding normal power control mode of the channel environment. For example, for a 12.2K bit Circuit Switching (CS) service, the target value in the AWGN channel environment is usually set as 6 dB, and in the 3GPP CASE1 channel environment, the target value is usually set as 9 dB.

For example, when $b > T_{reset}$, the target value of the SNR is reset as 6 dB, and when $b \leq T_{reset}$, the target value of the SNR is reset as 9 dB. Here, it is presumed that $b > T_{reset}$ corresponds to the AWGN channel environment, and $b \leq T_{reset}$ corresponds to the 3GPP CASE1 channel environment.

Figure 6:
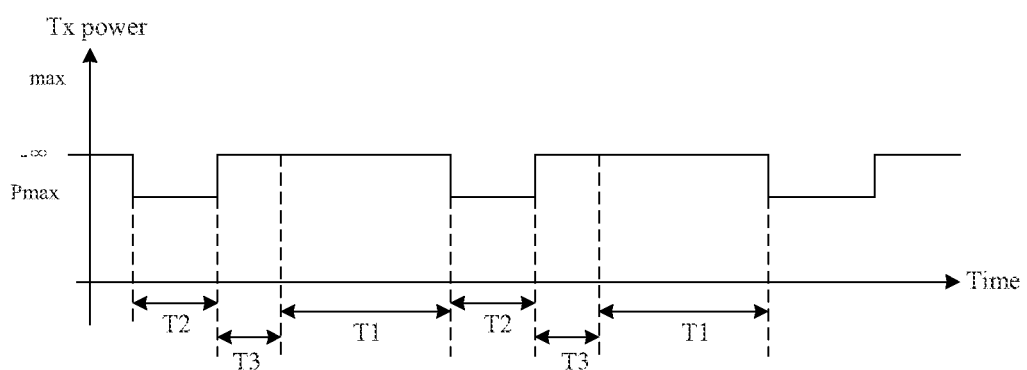
FIG. 6 is a schematic diagram showing a testing example for evaluating the capability of inhibiting windup effect for UE in a downlink power control of a TD-SCDMA system.

FIG. 6 shows a testing example for evaluating the capability of inhibiting windup effect for the UE in a downlink power control of a TD-SCDMA system, in which three periods of time for testing the inhibition of the windup effect are defined.

T1: there is no limitation on the downlink power. Namely, the base station can increase the signal transmission power according to the requirements of the UE. It is used to indicate that the downlink power control mode of the UE is a normal power control mode. T1 has a value of 100 ms.

T2: there is limitation on the downlink power. It is used to indicate that the transmission power of the base station in a weak signal scenario is limited to a certain level, such as P. P is an average value of Lor/Ioc in T1. T2 has a value of 5 s.

T3: there is no limitation on the downlink power again. It is used for stimulating the scenario in which the transmission power of the base station returns to a normal level.

The simulation condition for the testing example is 12.2 k bit Circuit Switching (CS) service in an AWGN environment, wherein the target value of the block error rate (BLER) may be set as in the range of 0.7% to 1.3%, and the initial transmission power of the base station=a desired transmission power for an expected target value of the BLER+10 dB. The simulation output is the Ior/Ioc desired for converging the BLER to the target value.

Figure 7:
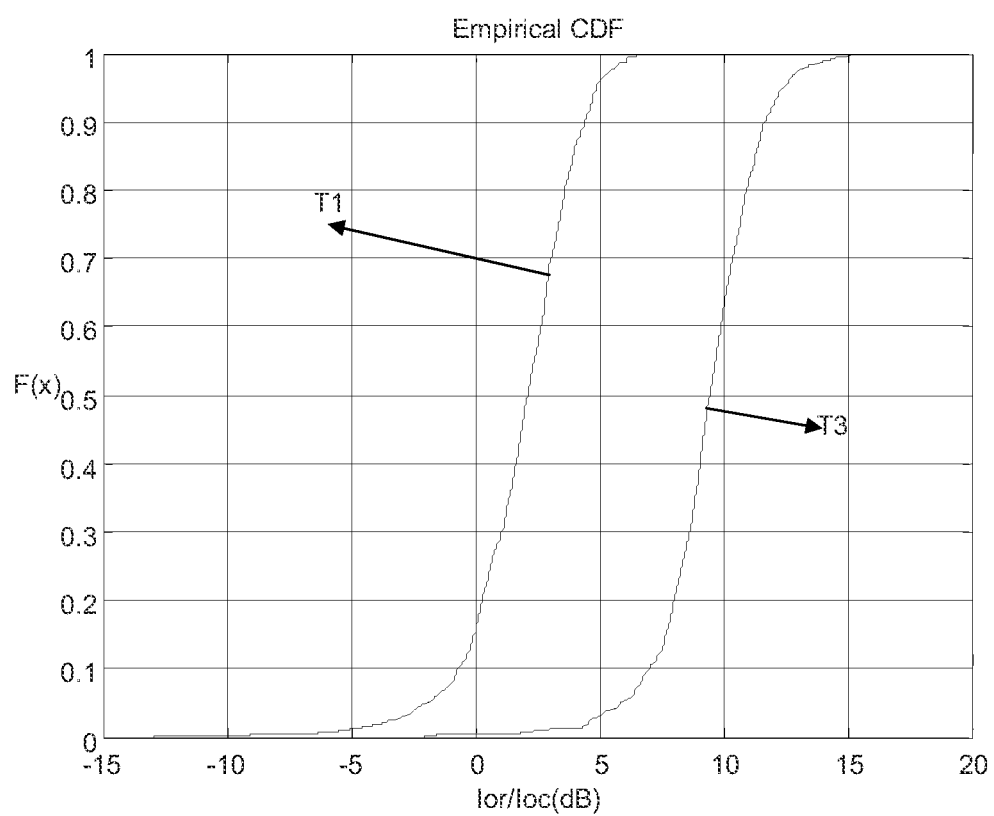
FIG. 7 is a schematic diagram showing simulation results of a method for the downlink power control in the prior art.
Figure 8:
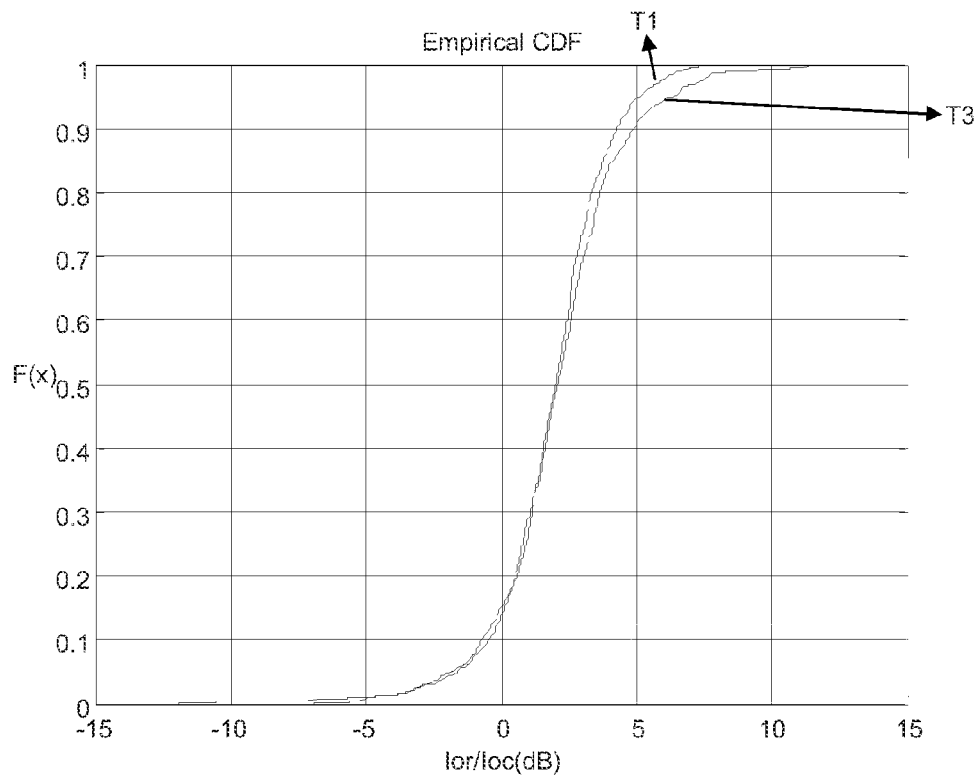
FIG. 8 is a schematic diagram showing simulation results of the downlink power control method according to the embodiments of the present invention.

Using the above-mentioned testing example, simulation results for a cumulative distribution function (CDF) of Ior/Ioc as shown in FIGS. 7 and 8 are obtained by performing simulations on the downlink power control method of a TD-SCDMA system in the prior art and the downlink power control method in this embodiment, respectively. It can be seen that, in the simulation result of the method in the prior art as shown in FIG. 7, the performance in T3 is decreased by more than 5 dB (at the probability of 90%) as compared with in T1, while in the simulation result of the method in this embodiment as shown in FIG. 8, the performance in T3 is decreased merely by about 0.5 dB (at the probability of 90%) as compared with in T1. Therefore, obvious improvement on the performance is achieved.

The power control method according to the embodiment of the present invention may be realized by virtue of hardware and/or software. Therefore, the method is adapted to be realized by virtue of processors such as a general purpose processor and a signal processor. A computer program includes program codes which are stored in a computer-readable medium, and which can be loaded and executed by the processor so as to enable the processor to implement the above-mentioned method.

For example, the present invention-provides a computer program including instructions. The instructions, when being executed by the processor, are arranged to enable the processor to implement the power control method according to the embodiments of the present invention. The present invention further provides a storage medium storing the above-mentioned computer program.

Figure 9:
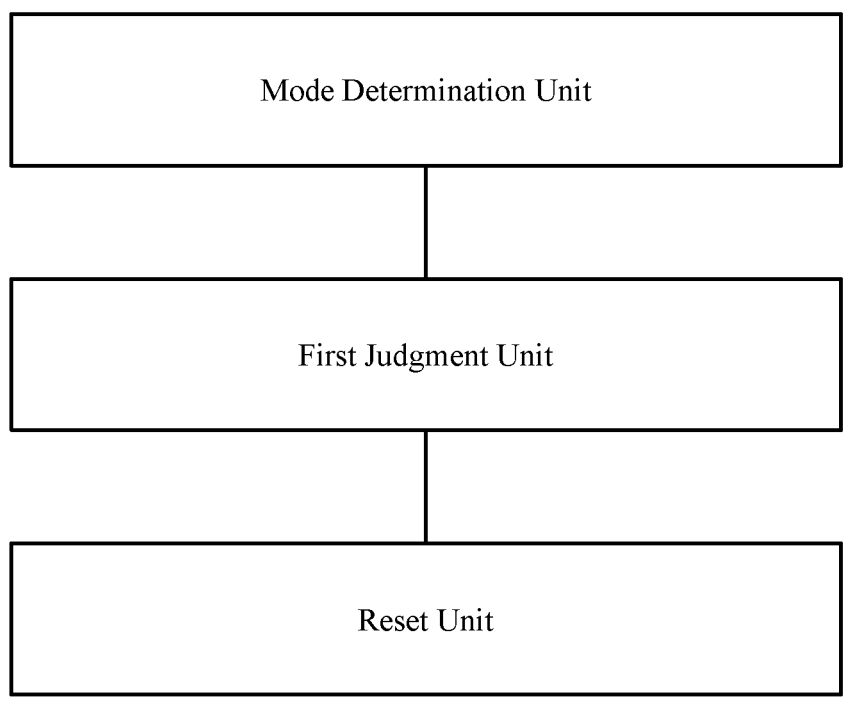
FIG. 9 is a schematic diagram showing the structure of UE according to some embodiments of the present invention.

FIG. 9 is a schematic diagram showing the structure of UE according to the embodiments of the present invention. The UE may be used to execute the step as shown in FIG. 2, so as to return the transmission power of the base station to a normal level as soon as possible, to reduce interference on the other UE, thereby to inhibit windup effect in a better manner.

As shown in FIG. 9, the UE may include:
a mode determination unit configured to, based on an adjustment trend of UE with respect to signal transmission power of a base station and a variation trend of the received signal quality, determine a current power control mode of the UE, wherein the mode determination unit being configured to, when the adjustment trend matches the variation trend, determine that the power control mode is a normal power control mode, and when the adjustment trend does not match the variation trend, determine that the power control mode is a windup effect mode;

a first judgment unit configured to, based on the determined power control mode of the UE, judge whether the power control mode returns to the normal power control mode after being in the windup effect mode; and a reset unit configured to, when the first judgment result indicates that the power control mode returns to the normal power control mode after being in the windup effect mode, reset a target value of the received signal quality for inner-loop power control.

The mode determination unit may include:
a first determination unit configured to determine an adjustment trend of the UE with respect to signal transmission power of the base station and a variation trend of the received signal quality of the UE;

a second judgment unit configured to judge whether the variation trend matches the adjustment trend:

a third judgment unit configured to, when the variation trend matches the adjustment trend, judge that the current power control mode of the UE is the normal power control mode, and otherwise judge that the current power control mode of the UE is the windup effect mode.

As a preferred embodiment for determining the variation trend, the first determination unit may include:
a first acquisition unit configured to acquire a plurality of estimated values obtained by performing estimation on the received signal quality in a latest period of time;

a fitting unit configured to perform curve fitting on the plurality of estimated values to obtain a curve; and a first calculation unit configured to calculate a curve slope of the curve at the latest estimated value, to obtain the variation trend.

Specifically, the curve is a straight line obtained by performing curve fitting on the plurality of estimated values using a Least Square Method (LSM). The curve slope is the slope of the straight line.

As a preferred embodiment for determining the adjustment trend, the first determination unit may include:
a second acquisition unit configured to, in the latest period of time, acquire a total number of times indicating that the UE requires the base station to adjust the signal transmission power, a first number of times indicating that the UE requires the base station to increase the signal transmission power, and a second number of times indicating that the UE requires the base station to decrease the signal transmission power;

a second calculation unit configured to calculate a first quotient of the first number and the total number, and a second quotient of the second number and the total number;

a first processing unit configured to, when the first quotient is greater than a first predetermined threshold, determine that the adjustment trend is that the UE requires the base station to increase the signal transmission power continuously;

a second processing unit configured to, when the second quotient is greater than a second predetermined threshold, determine that the adjustment trend is that the UE requires the base station to decrease the signal transmission power continuously; and a third processing unit configured to, when the first quotient is less than or equal to the first threshold and the second quotient is less thin or equal to the second threshold, determine that the adjustment trend is that the UE requires the base station adjust the signal transmission power non-unidirectionally.

As a preferred embodiment, the second judgment unit may include:

a second determination unit configured to, when the adjustment trend is that the UE requires the base station to increase the signal transmission power continuously, judge whether a variation trend of the received signal quality reaches an expected improvement trend, if yes, judge that the variation trend matches the adjustment trend, and if not, judge that the variation trend does not match the adjustment trend;

a third determination unit configured to, when the adjustment trend is that the UE requires the base station to decrease the signal transmission power continuously, judge whether a variation trend of the received signal quality reaches an expected deterioration trend, if yes, judge that the variation trend matches the adjustment trend, and if not, judge that the variation trend does not match the adjustment trend; and a fourth determination unit configured to, when the adjustment trend is that the UE requires the base station adjust the signal transmission power non-unidirectionally, judge that the variation trend matches the adjustment trend.

As a preferred embodiment, the UE may judge whether the power control mode returns to the normal power control mode based on the latest two recorded power control modes. At this time, the first determination unit may include:

a fourth judgment unit configured to judge that the power control mode returns to the normal power control mode only when a current power control mode of the UE currently recorded is the normal power control power and a previous power control mode of the UE is the windup effect mode.

As another preferred embodiment, the UE may judge whether the power control mode of the UE returns to the normal power control mode based on the power control mode recently recorded many times, so as to improve accuracy of condition judgment. At this time, the first judgment unit may include:

a counting unit configured to count a first number of the windup effect modes in N power control modes recently determined, and a second number of the windup effect modes in 2N power control modes recently determined;

a third calculation unit configured to calculate a difference between the second a number and a first number to obtain a third number, and calculate a difference between the third number and the first number to obtain a fourth number; and a fifth judgment unit configured to, when the fourth number is greater than a third predetermined threshold, judge that the power control mode returns to the normal power control mode.

In this embodiment, the reset unit may determine and record a target value of the received signal quality for inner-loop power control based on the variation trend of the received signal quality at the UE side. At this time, the reset unit may include:

a fifth determination unit configured to determine a target value corresponding to the variation trend, a first target value corresponding to a first variation trend being greater than or equal to a second target value corresponding to a second improvement trend, and the first variation trend being slower than the second variation trend; and a setting unit configured to set the target value of the received signal quality for inner-loop power control as the target value corresponding to the variation trend.

What is claimed is:

1. A method for power control of a mobile communication system, comprising:
    determining a current power control mode of the UE based on an adjustment trend of a user equipment, UE, with respect to signal transmission power of a base station and a variation trend of a received signal quality, wherein, when the adjustment trend matches the variation trend, the power control mode is determined as being a normal power control mode, and, when the adjustment trend does not match the variation trend, the power control mode is determined as being a windup effect mode, wherein, the determining of the adjustment trend of the UE with respect to signal transmission power of the base station comprises:
        acquiring, in a latest period of time, a total number of times indicating that the UE requires the base station to adjust the signal transmission power, a first number of times indicating that the UE requires the base station to increase the signal transmission power, and a second number of times indicating that the UE requires the base station to decrease the signal transmission power;
        calculating a first quotient of the first number and the total number, and a second quotient of the second number and the total number;
        determining that the adjustment trend is that the UE requires the base station to increase the signal transmission power continuously when the first quotient is greater than a first threshold;
        determining that the adjustment trend is that the UE requires the base station to decrease the signal transmission power continuously when the second quotient is greater than a second threshold; and
        determining that the adjustment trend is that the UE requires the base station to adjust the signal transmission power non-unidirectionally when the first quotient is less than or equal to the first threshold and the second quotient is less than or equal to the second threshold;
    judging whether the power control mode returns to the normal power control mode after being in the windup effect mode based on the determined power control mode of the UE; and
    resetting a target value of the received signal quality for an inner-loop power control when judged that the power control mode returns to the normal power control mode after being in the windup effect mode.

2. The method according to claim 1, wherein, the determining of the variation trend of the received signal quality of the UE comprises:

acquiring a plurality of estimated values obtained by estimating the received signal quality in a latest period of time;

performing a curve fitting on the plurality of estimated values to obtain a curve; and calculating a curve slope of the curve at a latest among the estimated values to obtain the variation trend.

3. The method according to claim 2, wherein, the curve is a straight line obtained by performing curve fitting on the plurality of estimated values using a Least Square Method, and the curve slope is a slope of the straight line.

4. The method according to claim 1, wherein, the judging of whether the variation trend matches the adjustment trend comprises:

when the adjustment trend is that the UE requires the base station to increase the signal transmission power continuously, a result of the judging is that the variation trend of the received signal quality reaches the improvement trend, if the variation trend matches the adjustment trend, and the result of the judging is that the variation trend of the received signal quality does not reach the improvement trend if the variation trend does not match the adjustment trend.

5. The method according to claim 1, wherein, the judging of whether the variation trend matches the adjustment trend comprises:

when the adjustment trend is that the UE requires the base station to decrease the signal transmission power continuously, a result of the judging is that the variation trend of the received signal quality reaches a deterioration trend, if the variation trend matches the adjustment trend, and the result of the judging is that the variation trend of the received signal quality does not reach the deterioration trend if the variation trend does not match the adjustment trend.

6. The method according to claim 4, wherein, the judging of whether the variation trend matches the adjustment trend further comprises:

when the adjustment trend is that the UE requires the base station adjust the signal transmission power non-unidirectionally, a result of the judging is that the variation trend matches the adjustment trend.

7. The method according to claim 1, wherein, the resetting of the target value of the received signal quality for the inner-loop power control based on the variation trend of the received signal quality at the UE side comprises:

determining a target value corresponding to the variation trend, a first target value corresponding to a first variation trend being greater than or equal to a second target value corresponding to a second improvement trend, and the first variation trend being slower than the second variation trend; and setting the target value of the received signal quality for the inner-loop power control as the target value corresponding to the variation trend.

8. A user equipment, UE, configured to perform power control in a mobile communication system, the UE comprising:

a mode determination unit configured to determine a current power control mode of the UE based on an adjustment trend of the UE with respect to signal transmission power of a base station and a variation trend of received signal quality, wherein the mode determination unit is configured to determine that the power control mode is a normal power control mode when the adjustment trend matches the variation trend, and that the power control mode is a windup effect mode when the adjustment trend does not match the variation trend, wherein the first determination unit comprises:

a second acquisition unit configured to acquire, in a latest period of time, a total number of times indicating that the UE requires the base station to adjust the signal transmission power, a first number of times indicating that the UE requires the base station to increase the signal transmission power, and a second number of times indicating that the UE requires the base station to decrease the signal transmission power;

a second calculation unit configured to calculate a first quotient of the first number and the total number, and a second quotient of the second number and the total number;

a first processing unit configured to determine that the adjustment trend is that the UE requires the base station to increase the signal transmission power continuously when the first quotient is greater than a first predetermined threshold;

a second processing unit configured to determine that the adjustment trend is that the UE requires the base station to decrease the signal transmission power continuously when the second quotient is greater than a second predetermined threshold; and a third processing unit configured to determine that the adjustment trend is that the UE requires the base station adjust the signal transmission power non-unidirectionally when the first quotient is less than or equal to the first threshold and the second quotient is less than or equal to the second threshold;

a first judgment unit configured to judge whether the power control mode returns to the normal power control mode after being in the windup effect mode, based on the determined power control mode of the UE;

a reset unit configured to, when the power control mode returns to the normal power control mode after being in the windup effect mode, reset a target value of the received signal quality for inner-loop power control.

9. The UE according to claim 8, wherein the first determination unit comprises:

a first acquisition unit configured to acquire a plurality of estimated values obtained by estimating the received signal quality in a latest period of time;

a fitting unit configured to perform a curve fitting on the plurality of estimated values to obtain a curve; and a first calculation unit configured to calculate a curve slope of the curve at a latest among the estimated values, to obtain the variation trend.

10. The UE according to claim 9, wherein, the curve is a straight line obtained by performing curve fitting on the plurality of estimated values using a Least Square Method, and the curve slope is a slope of the straight line.

11. The UE according to claim 8, wherein the second judgment unit comprises:

a second determination unit configured, when the adjustment trend is that the UE requires the base station to increase the signal transmission power continuously, to judge that the variation trend of the received signal quality reaches an improvement trend, if the variation trend matches the adjustment trend, and that the variation trend of the received signal quality does not reach the improvement trend if the variation trend does not match the adjustment trend.

12. The UE according to claim 8, wherein the second judgment unit comprises:
a third determination unit configured when the adjustment trend is that the UE requires the base station to decrease the signal transmission power continuously, to judge that the variation trend of the received signal quality reaches an expected deterioration trend, if the variation trend matches the adjustment trend, and that the variation trend of the received signal quality does not reach the expected deterioration trend if not, judge that the variation trend does not match the adjustment trend.

13. The UE according to claim 11, wherein the second judgment unit further comprises:
a fourth determination unit configured, when the adjustment trend is that the UE requires the base station adjust the signal transmission power non-unidirectionally, to judge that the variation trend matches the adjustment trend.

14. The UE according to claim 8, wherein the reset unit comprises:
a fifth determination unit configured to determine the target value corresponding to the variation trend, a first target value corresponding to a first variation trend being greater than or equal to a second target value corresponding to a second improvement trend, and the first variation trend being slower than the second variation trend; and
a setting unit configured to set the target value of the received signal quality for the inner-loop power control as the target value corresponding to the variation trend.

15. A non-transitory computer readable medium storing program instructions, which, when executed by a processor, enable the processor to execute the steps of:
determining a current power control mode of the UE based on an adjustment trend of a user equipment, UE, with respect to signal transmission power of a base station and a variation trend of a received signal quality, wherein, when the adjustment trend matches the variation trend, the power control mode is determined as being a normal power control mode, and, when the adjustment trend does not match the variation trend, the power control mode is determined as being a windup effect mode, wherein, the determining of the adjustment trend of the UE with respect to signal transmission power of the base station comprises:
acquiring, in a latest period of time, a total number of times indicating that the UE requires the base station to adjust the signal transmission power, a first number of times indicating that the UE requires the base station to increase the signal transmission power, and a second number of times indicating that the UE requires the base station to decrease the signal transmission power;
calculating a first quotient of the first number and the total number, and a second quotient of the second number and the total number;
determining that the adjustment trend is that the UE requires the base station to increase the signal transmission power continuously when the first quotient is greater than a first threshold;
determining that the adjustment trend is that the UE requires the base station to decrease the signal transmission power continuously when the second quotient is greater than a second threshold; and
determining that the adjustment trend is that the UE requires the base station to adjust the signal transmission power non-unidirectionally when the first quotient is less than or equal to the first threshold and the second quotient is less than or equal to the second threshold;
judging whether the power control mode returns to the normal power control mode after being in the windup effect mode based on the determined power control mode of the UE; and
resetting a target value of the received signal quality for an inner-loop power control when judged that the power control mode returns to the normal power control mode after being in the windup effect mode.

* * * * *

UNITED STATES PATENT AND TRADEMARK OFFICE
CERTIFICATE OF CORRECTION

| | | |
|---|---|---|
| PATENT NO. | : 9,681,394 B2 | Page 1 of 2 |
| APPLICATION NO. | : 14/374936 | |
| DATED | : June 13, 2017 | |
| INVENTOR(S) | : Huang et al. | |

It is certified that error appears in the above-identified patent and that said Letters Patent is hereby corrected as shown below:

On the Title Page

Below item (54), in Column 1, insert -- (71) Applicant: Optis Circuit Technology, LLC, Plano, TX (US) --.

In Column 1, delete item "(75)" and insert item -- (72) --, therefor.

In the Drawings

In Fig. 8, Sheet 7 of 8, delete " 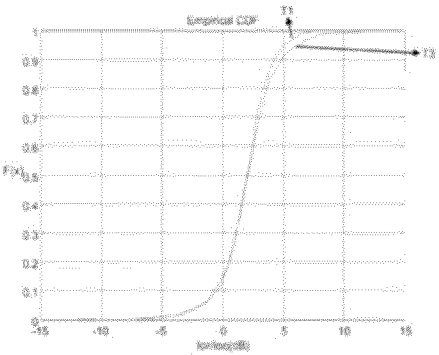 " and insert

-- 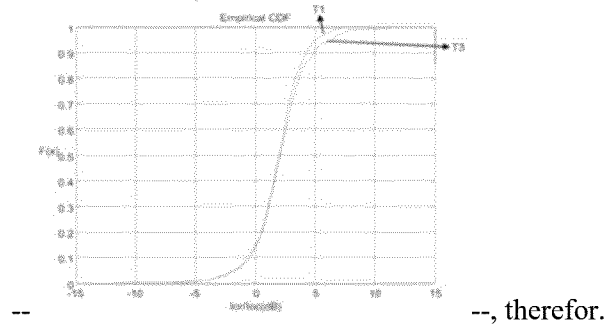 --, therefor.

Signed and Sealed this
Seventeenth Day of December, 2019

Andrei Iancu
*Director of the United States Patent and Trademark Office*

In the Specification

In Column 14, Line 38, delete "trend:" and insert -- trend; --, therefor.

In Column 15, Line 17, delete "less thin" and insert -- less than --, therefor.